United States Patent [19]

Larsen

[11] Patent Number: 4,823,444
[45] Date of Patent: * Apr. 25, 1989

[54] EXTENSIBLE LOOP HOOK FASTENING DEVICE

[76] Inventor: Walter Louis Larsen, P.O. Box 18302, Seattle, Wash. 98118

[*] Notice: The portion of the term of this patent subsequent to Mar. 18, 2003 has been disclaimed.

[21] Appl. No.: 840,607

[22] Filed: Mar. 17, 1986

[51] Int. Cl.[4] .............................................. A44B 13/02
[52] U.S. Cl. ................... 24/231; 24/241 SL; 24/238; 211/113; 223/DIG. 4
[58] Field of Search ............... 24/524, 529, 532, 533, 24/566, 231, 241 R, 241 SL, 230.5 R; 223/DIG. 4, 85; 211/113 R, 124

[56] References Cited

U.S. PATENT DOCUMENTS

| | | | |
|---|---|---|---|
| 382,611 | 5/1888 | Howe | 24/239 |
| 470,975 | 3/1892 | Blakey | 24/533 |
| 707,533 | 8/1902 | Albee | 24/231 |
| 822,675 | 6/1906 | Liliger | 24/241 SL X |
| 1,047,284 | 12/1912 | Pfustler . | |
| 1,093,945 | 4/1914 | Ohlsson | 24/230.5 R X |
| 1,618,941 | 9/1926 | Meade | 24/239 |
| 2,122,309 | 6/1938 | Beimler | 223/DIG.4 X |
| 2,442,410 | 6/1948 | Harpole et al. | 211/113 |
| 2,474,429 | 6/1949 | Kreitmayr | 223/DIG. 4 X |
| 2,616,203 | 3/1950 | Sarakas | 24/236 |
| 2,877,941 | 12/1957 | Melone . | |
| 2,987,792 | 6/1961 | O'Brien | 24/241 SL X |
| 3,115,381 | 12/1960 | Hoag | 24/239 |
| 3,202,329 | 8/1965 | Schmidt | 223/85 |
| 3,373,878 | 3/1968 | Daitch | 223/85 X |
| 3,704,487 | 12/1972 | Mohr | 24/73 |
| 4,575,906 | 3/1986 | Larsen | 24/238 |
| 4,646,396 | 3/1987 | Geese | 24/230.5 R |

FOREIGN PATENT DOCUMENTS

| | | | |
|---|---|---|---|
| 648699 | 8/1937 | Fed. Rep. of Germany | 24/524 |
| 1500741 | 9/1967 | France . | |
| 102462 | 9/1941 | Sweden | 24/241 |
| 134235 | 1/1952 | Sweden | 223/DIG. 4 |

Primary Examiner—Kenneth J. Dorner
Assistant Examiner—Laurie K. Cranmer

[57] ABSTRACT

This device pertains primarily to supplementary fastening devices in the form of a rigid or semi rigid clip having a loop shaped portion for fastening the hook of a garment hanger or other hook including device to a clothesline or other generally linear member to which the hook is hooked. The effective length of the loop portion of the clip is increasable against the bias of an elastic member to provide for positive clamping action of the clip on the hook.

64 Claims, 3 Drawing Sheets

FIG. 11

EXTENSIBLE LOOP HOOK FASTENING DEVICE

CROSS REFERENCE TO RELATED APPLICATION

This application contains subject matter presented in copending application Ser. No. 06/028,850, filed Apr. 10, 1979, entitled Hook Fastening Device, said application having issued as U.S. Pat. No. 4,575,906 on Mar. 18, 1986.

BACKGROUND ART

A bendable loop-type hook fastening device is set forth in French Pat. No. 1,500,741 issued to Jacob. A semi-rigid loop-type clip adapted to close the hook opening of hooks having substantially parallel sections is set forth in U.S. Pat. No. 2,122,309 issued to Beimler. A elongatable link in the form of an elastic strip of material having two longitudinally spaced holes and adapted to close the opening of a hook in a manner similar to that shown in Beimler is presented in U.S. Pat. No. 2,877,941 issued to Melone. Other attempts to solve the problem of fastening a garment hanger to a linear member having resulted in devices which attach to the linear member and then, in turn, suspend the garment hanger hook from the device itself. Examples of devices in this category are U.S. Pat. Nos. 2,092,121; 2,915,274; and 3,184,204. There have also been devices which replace or modify the garment hanger hook in order to more positively fasten the garment hanger to a clothesline, of which the following are examples: U.S. Pat. Nos. 1,690,614; 3,048,311; 3,240,462; and 4,034,902.

An extensible loop type clip adapted as nose clamp for horses is set forth in U.S. Pat. No. 1,047,284 issued to Pfustler. A snap hook device having some characteristics of my invention appears in U.S. Pat. No. 382,611. Additional devices which were made for other purposes but which may have some relevance to the structure of my invention are set forth in U.S. Pat. Nos. 1,093,945; 1,618,941; 1,797,539; 2,616,203; 3,115,381; and 4,419,874.

DISCLOSURE OF INVENTION

There has long been a need for a practical fastening device which could fasten a garment hanger or other hook including device to a clothesline or other generally linear member. In the case of garment hangers, they are commonly used for holding various articles of clothing while they dry after being laundered. When suspended from a clothesline, garment hangers are often blown by the wind along the clothesline, particularly when the clothesline has appreciable sag, with the result that several suspended garment hangers may bunch together and thereby retard the drying. In gusty winds, suspended garment hangers are often blown off the clothesline.

Some of the previous attempts to solve these problems have involved modifications to, or replacement of, the hook of the garment hanger. In some cases this has resulted in devices which are very limited in the range of diameters of supporting clotheslines which could be accomodated. Nearly always, such devices resulted in higher product cost. Such devices also lacked convenience and flexibility since they could only be used with the particular garment hanger on which they were installed. Other devices have been made which merely close the opening of a garment hanger hook without any capability for fractionally fastening the hook to a clothesline so as to prevent displacement of the hook along the clothesline. Other attempts at solving these problems have produced devices which attach to the clothesline and then, in turn, suspend the garment hanger hook from the device itself. These devices appear to be costly and/or ineffectual at retaining the hook in suspension under adverse conditions. The bendable loop set forth in French Pat. No. 1,500,741 is a separate fastening device which does fasten a hook to a clothesline. However, this device is quite limited in the range of hook and clothesline sizes which it can accomodate and is also limited in the amount of clamping force which it can exert on the hook and the clothesline.

In order to alleviate problems such as the foregoing, this invention provides a supplementary fastening device in the form of a rigid or semi rigid loop-shaped clip, in which the effective length of the loop is elastically elongatable, for securing the hook of a garment hanger or other hook including device to a clothesline or other generally linear member when the hook is hooked to the linear member in the normal manner. The clip is arranged and installed so as to pass over and contact the hook at two locations, one on each side of the linear member, and to pass under the linear member between the two locations where it contacts the hook. This fastening device thus acts to lock the suspended hook to the supporting linear member. The loop shaped clip may have an openable section or an open section in the loop to facilitate installation of the clip on the hook when the hook is hooked to the linear member.

It is therefore an object of the present invention to provide a supplementary fastening device for fastening the hook of a garment hanger or other hook or similarly curved member including device to a clothesline or other generally linear member to which the hook is attached by being hooked to the linear member.

It is also an object of this invention to provide a fastening device for securing a hook or curved member to a generally linear member, which is inexpensive to manufacture and easy to use, and which will tend to prevent a hook, which is hooked to a linear member, from being unintentionally unhooked from the linear member and from being displaced from its desired position along the linear member.

Another object of this invention is to provide a device for fastening an object to a linear member, said device being comprised of the combination of a hook and a loop-type fastening device.

It is also an object of this invention to provide methods for fastening a hook to a linear member.

An additional object of this invention is to provide a spring device which has a non-linear force-displacement relationship for applications, including the fastening device herein described, in which it is necessary or desirable to have non linear forces or to avoid high return forces at the upper range of spring displacement.

Other objects and advantages will become apparent and a fuller understanding of the invention may be had by referring to the detailed description hereinafter presented, taken in conjunction with the drawings forming a part hereof, wherein like numerals refer to like parts throughout.

MODES FOR CARRYING OUT THE INVENTION

This invention is primarily a fastening device in the form of a rigid or semi rigid generally loop-shaped clip, in which the effective length of the loop portion of the clip is elastically elongatable, and which is adapted for fastening the hook of a garment hanger or other hook including device to a clothesline or other linear member to which the hook is attached by being hooked to the linear member in the normal manner.

Figures 1, 7:
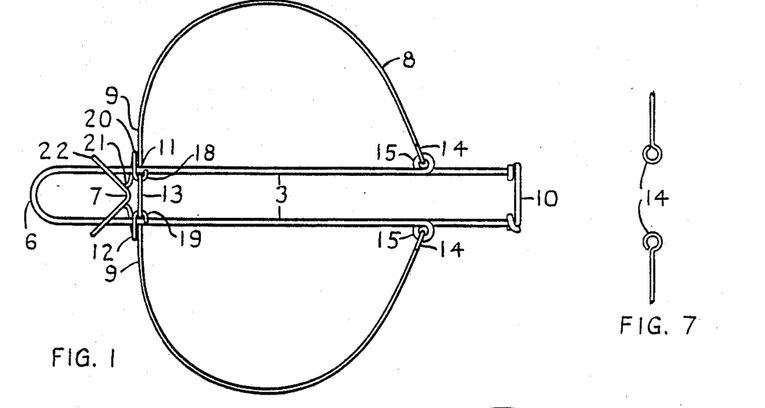
FIG. 1 is a plan view of the clip type elongatable loop fastening device with a generally C-shaped spring provided with thumb and finger rests, and movable loop end being in the position of minimum effective length of the loop.
FIG. 7 is a fragmentary end view, as viewed from the right, of that portion of the generally C-shaped spring which pivotally attaches to the body of the device of FIG. 1.
Figures 2, 8:
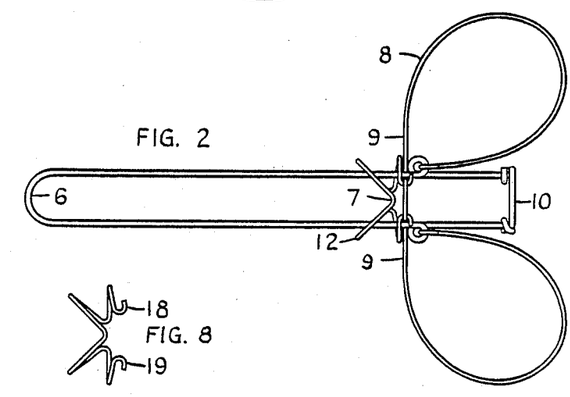
FIG. 2 is a plan view of the device shown in FIG. 1 with the movable loop end being in the position of maximum effective length of the loop.
FIG. 8 is a plan view of the spring loaded clip of the device shown in FIGS. 1 and 2, removed from the device.
Figure 9:
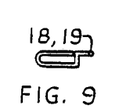
FIG. 9 is a side elevational view of the spring loaded clip shown in FIG. 8.
Figure 10:
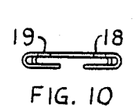
FIG. 10 is an end view of the spring loaded clip shown in FIGS. 8 and 9.
Figure 11:
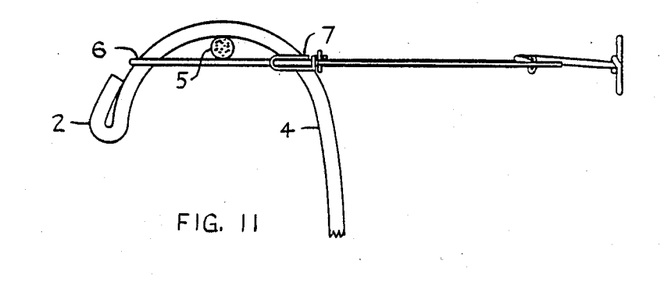
FIG. 11 is a side elevational view of the loop fastening device shown in FIGS. 1 and 2 installed in its fastening position on a garment hanger hook and a clothesline.

FIGS. 1 through 11 depict one embodiment of this fastening device in the form of a clip having a generally elongated loop of rigid or semi rigid construction in which the clip has means for allowing the effective length of the loop to be elastically extended. In this embodiment the clip is comprised of a loop body having side members, 3, forming the sides of the loop, and a fixed loop end, 6, which is attached to the side members, 3, and which forms one end of the loop. There is also a movable loop end, 7, which effectively comprises the other end of the loop, and which is arranged to slide back and forth along the side members, 3, of the loop body in order to increase and decrease the effective length of the loop. The effective length of the loop is that length which extends between the fixed loop end, 6, and the movable loop end, 7. The side members, 3, of the loop body form the sides and side extensions of the loop; the sides of the loop being that variable portion of the side members which is included in the effective length of the loop as the loop assumes different effective lengths depending on the position of the movable loop end, 7. The elastic force which urges the movable loop end, 7, in a direction of decreasing the effective length of the loop is provided by a generally C-shaped spring, 8. This C-shaped spring, 8, provides finger rests, 9, and the loop body has a thumb rest, 10, which allows the device depicted in FIG. 1 to be held and manipulated in a manner analogous to the manner of holding and manipulating a hypodermic syringe. When this device is so held and the finger rests, 9, are squeezed toward the thumb rest, 10, the loop portion of the fastening device becomes elongated and the C-shaped spring, 8, becomes bent as shown in FIG. 2. While the loop is thus elongated, this device can be maneuvered and installed in a fastening position on a garment hanger hook, 2, which is suspended from a clothesline, 5, or other linear member (with reference to FIG. 11) by reaching over the suspended hook, with the end of the hook pointing away from the person, passing the end of the hook through the loop of the fastening device, pulling the fastening device toward the person so that the fixed loop end, 6, of the device passes between the hook and the clothesline (under the hook but over the clothesline), then moving the fastening device so that the fixed loop end, 6, moves under the clothesline, 5, toward the end of the hanger hook, 2, and finally passing the end of the hanger hook through the loop, once again, and raising and releasing the fastening device in a position as shown in FIG. 11. An alternative method of installing the fastening device would be to position the loop on the shank portion, 4, or inboard section of the hook (so that the shank portion of the hook passes through the loop) before suspending the garment hanger from the clothesline. Then, after the garment hanger hook is suspended from the clothesline, the loop portion of the fastening device can be elongated as described above and the device moved, raised, and released in a fastening position as shown in FIG. 11. It does not make much difference whether the fixed loop end, 6, of the loop is on the outboard section, 2, of the hook (that section near the end of the hook) or the inboard section, 4, of the hook when the device is in its fastening position.

FIG. 11 illustrates the means by which this fastening device achieves excellent effectiveness and stability in its preferred fastening position. As shown, the loop contacts the outside surface of the hook, 2, at two spaced-apart locations, one such location, at the fixed loop end, 6, being outboard, and the other location, at the movable loop end, 7, being inboard of the position occupied by the clothesline, 5. At each of these two locations, at 6 and 7, the curved outer surface of the hook is substantially inwardly inclined away from the vertical which creates an inclined ramp effect on these curved surfaces. These inwardly inclined surfaces react with the tendency of the effective length of the loop to become shorter due to the bias of the spring, 8, and this creates a force which tends to push the loop in an upward direction on the hook. In so doing, this causes the loop to lift up on the undersurface of the clothesline, 5, and to push it toward the undersurface of the hook. This creates a clamping force which frictionally binds the hook and the clothesline together. If the clothesline was replaced with a much larger diameter supporting rod, such as a typical closet hanger rod, this type of positive clamping action could not be achieved since the loop would either be forced to a position off of the hook, or, if the hook had a sufficiently long end section, 2, (which the illustrated hook does not have) the loop would be forced to occupy a position on the hook that was so low that it could not take advantage of the substantially inwardly inclined outer surfaces on the upper section of the hook to achieve such positive fastening action. Such positive fastening action thus requires (with typically shaped hooks) that the supporting linear member be comparatively thin with respect to the size of the hook. The meaning of the term "comparatively thin" as used herein to describe the size of the linear member means that the size of the linear member is determined with respect to the size and shape of the hook that is being fastened to the linear member and that such size does not exceed that which will allow the loop-type fastening device to be installed in a position which will effectively produce the above described positive clamping and locking action resulting from the loop being installed on the substantially inwardly inclined outer surfaces of the hook as set forth above.

Figure 3:
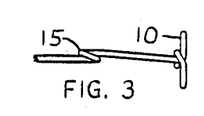
FIG. 3 is a fragmentary side elevational view of the thumb rest end of the loop body of the device of FIG. 1.
Figure 4:
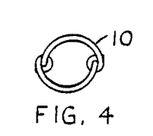
FIG. 4 is an end view of the thumb rest shown in FIG. 3.
Figure 5:
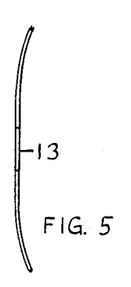
FIG. 5 is a fragmentary plan view of that portion of the generally C-shaped spring which crosses the loop body of the device shown in FIG. 1.
Figure 6:
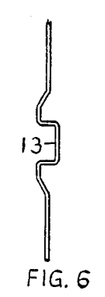
FIG. 6 is a fragmentary end view, taken from the left, of that portion of the C-shaped spring shown in FIG. 5.

FIGS. 3 and 4 are additional views of the thumb rest, 10, of the device shown in FIG. 1 and show how the ends of the wire forming the loop body can be bent to form the thumb rest, 10. FIGS. 5 and 6 show details of the center section of the C-shaped spring at the location, 11, where it crosses the side members, 3, of the loop body in FIG. 1. As depicted, this fastening device uses a spring loaded clip, 12, to slidably attach the C-shaped spring, 8, to the side members, 3, at this crossing location, 11. In this case the wire in the center section of the C-shaped spring is bent so that it forms a generally square cornered raised section, 13, which protrudes between the side members, 3, and is capable of being locked in place by the spring loaded clip, 12.

The ends of the C-shaped spring, which are bent in small eyelet loops, 14, for pivotal connection to the side members, 3, of the loop body at the pivotal connection points, 15, are shown, in end view, in FIG. 7. The pivotal connection points, 15, on the loop body are, in this case, formed as small eyelet loops, 15, in the wire of the side members as shown in FIGS. 1 and 2.

The spring loaded clip, in its unattached and unloaded state, is shown in three views in FIGS. 8 through 10. This clip has two outward opening and outwardly biased hooks, 18 and 19, which hook to the raised section, 13, of the C-shaped spring, 8, and slidably lock it to the side members, 3, of the loop body as shown in FIG. 1. When assembled in the fastening device, the wire of the spring loaded clip extends outward from one of its hooks, 18, past the side member on its side to a position, 20, outboard of the side member. Then the wire is bent in a generally reverse direction so as to extend inward and to pass by the opposite said of the same side member. Then, before reaching the middle of the loop body, the wire is bent generally outward again, at 21, and then is bent generally around the outside of the same side member, at 22, and then the wire extends inward to the center and on the same side of the loop body as the hooks, 18 and 19, are located where it may be formed into a V-shaped detent, at 7, to form a movable loop end for the fastening device which acts to center and align the hanger hook with the longitudinal axis of the loop body. Then the wire continues across to, and is bent around, the other side member, as shown, in generally the same manner as being bent around the first side member and then the wire terminates at the second hook, 19, in the spring loaded clip. This clip thus serves the dual function of movable loop end and of an interlocking clip to slidably attach the spring to the side members.

The C-shaped spring, 8, used in this fastening device has a unique advantage in that the force which it provides at the crossing location, 11, to urge the movable loop end toward a position of minimum effective length of the loop, as shown in FIG. 1, becomes substantially less at the position of maximum deflection and maximum effective length of the loop, as shown in FIG. 2, than would be the case with a more typical spring, such as a helical type spring in which the force-displacement relationship is essentially linear. This allows the person using the fastening device with a C-shaped spring to hold it in the position of maximum deflection of the spring, FIG. 2, with less exertion during installation and removal of the device in its fastening position than would otherwise be required. The amount of this reduction in force at maximum deflection is determined to some extent by the shape of the C-shaped spring. An increase in the degree of curvature in that portion of the spring which is closer to the crossing location, 11 (FIG. 1), than to the ends of the spring wire, 14, generally causes a further reduction in the force at maximum deflection of the C-shaped spring.

From the foregoing, it is clear that the meaning of the terms that the effective length of the loop is elastically extensible or elongatable is that the amount of such extensibility or elongatability is sufficient in magnitude to provide for the installation and effective operation of the device, including resilient clamping of the loop to the outer surface of the hook, without any necessity for resilient flexing of the hook to accomodate or allow for installation of the loop on the hook or to provide for such resilient clamping action.

Figures 12, 13, 14:
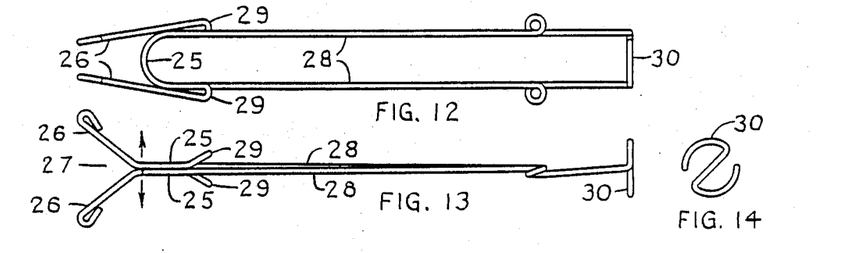
FIG. 12 is a plan view of the loop body portion of a fastening device similar to that shown in FIG. 1, wherein the loop body has an openable section in the loop.
FIG. 13 is a side elevational view of the loop body shown in FIG. 12.
FIG. 14 is an end view of the thumb rest of the loop body shown in FIGS. 12 and 13.

A modified form of loop body which improves the ease of installing and removing the fastening device in its fastening position when the hook is hooked to the clothesline or other linear member, and which can be directly substituted for the loop body in the device of FIGS. 1 and 2, is shown in FIGS. 12 and 13. Here the fixed loop end of the loop body is formed of two overlapping segments, 25, to create an openable section in the loop. These overlapping segments, which are normally held together by spring pressure from the loop body, can be separated in the directions indicated by the arrows in FIG. 13 to open the fixed loop end of the loop body and thereby allow the shank or inboard section of a hanger hook which is suspended from a clothesline to be inserted directly into the inner region of the loop without first passing the end of the hook through the loop as is necessary with the device shown in FIGS. 1-11. These two mutually separable segments, 25, comprise an effectively closed openable section in the loop, located, in this case, in the effectively closed fixed loop end of the loop, which allows the fastening device to be just as effective for fastening a hook to a linear member as those devices in which there is no openable section. Each overlapping segment, 25, may be provided with a structure, 26, which extends away from the fixed loop end of the loop body at an angle, as shown in FIG. 13, and which provides a ramped entry region, 27, at the end of the loop body. Thus it can be seen that if the fastening device is moved so that the shank of a hanger hook which is suspended from a clothesline enters the ramped entry region, 27, with the shank approximately in or parallel to the plane of the loop body, the device can then be pushed toward and against the shank causing it to react with these ramped entry structures, 26, forcing the overlapping segments, 25, apart, and thereby allowing the device to be further moved in the same direction until the shank or inboard section of the hanger hook enters into the inner region of the loop. In performing this operation, the fastening device is, of course, held so that the movable loop end is in a position of maximum effective length of the loop corresponding to the position shown in FIG. 2. After the shank of the hook is within the inner region of the loop, the fastening device can than be titled approximately 90 degrees so that the plane of the loop body is approximately parallel to the clothesline and the device can than be raised, passing the end of the hanger hook through the loop, and released in a fastening position corresponding generally with that shown in FIG. 11.

The modified loop body of FIGS. 12 and 13 also permits the fastening device to be removed from its fastening position and directly separated from the hanger hook without slipping the loop body off the end of the hanger hook. In removing this fastening device, the loop is first elongated to correspond with the situation as shown in FIG. 2, the fastening device is lowered so that only the shank of the hanger hook remains with the inner region of the loop, and the device is then generally tilted about 90 degrees so that the shank of the hook contacts the side members, 28, and forces the overlapping segments, 25, to separate, thus opening the loop. Then the fastening device can simply be pulled back so that the shank of the hanger hook passes out of the opened section of the loop. It can be seen that each overlapping segment, 25, without the ramped entry structure, 26, forms a generally J-shaped structure with the side member, 28, being the straight part of the "J". That part of each overlapping segment corresponding with the end of the curved part of the "J", 29, can be bent away at an angle from the plane of the loop body, as shown in FIG. 13, to form a ramped exit region to facilitate withdrawing the shank of the hanger hook from the inner region of the loop.

Having an openable section at the fixed loop end of the loop body, as in FIGS. 12 and 13, generally requires that the ends of the wire or other material forming the loop body be at that end of the loop body. In this case the thumb rest, 30, at the other end of the loop body can be formed by bending and curving the wire between the side members, 28, as shown in FIGS. 12 through 14. .

Figures 15, 16, 17, 18, 19:
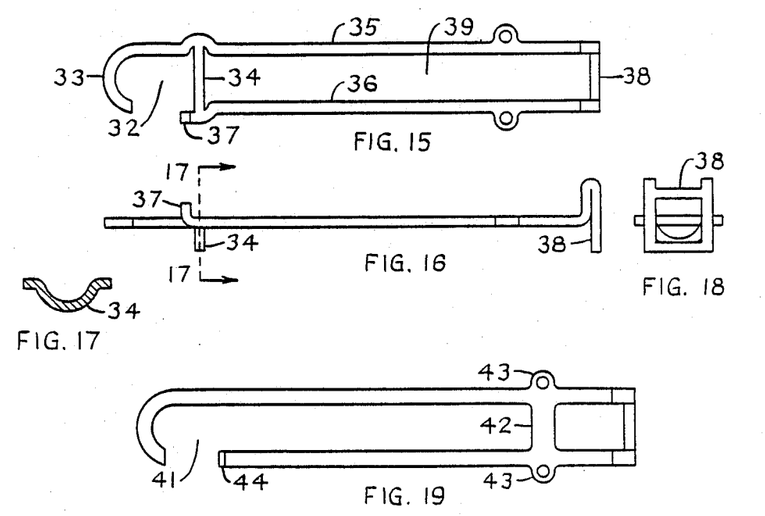
FIG. 15 is a plan view of the loop body portion of a fastening device similar to that shown in FIG. 1 wherein the loop body has an open section in a portion of the loop.
FIG. 16 is a side elevational view of the loop body shown in FIG. 15.
FIG. 17 is a view of the section at the plane indicated by the line 17—17 of FIG. 16.
FIG. 18 is an end view of the loop body shown in FIG. 16.
FIG. 19 is a plan view of the loop body portion of a fastening device similar to that shown in FIG. 15 wherein the open section is open to the full effective length of the loop.

Instead of having an openable section in the loop, there may be a permanently open section in order to facilitate installation and removal of the fastening device. It should be noted, however, that even though there may be such an open section in the loop, the result is still that of an effectively closed loop insofar as the action of the fastening device on the combination of the clothesline and suspended hook is concerned. One configuration of a loop body with an open section is shown in FIGS. 15 through 18. Here the open section, 32, is located to one side of the fixed loop end, 33. There is a structural support member, 34, connecting the two side members, 35 and 36, near the open section, 32, to provide strength and stiffness for the side member, 36, which is on the same side of the loop body as the open section, 32. This support member, 34, may be curved downward, as shown in FIG. 17, to provide clearance with the suspended hanger hook. There may also be a short projection, 37, at or near the end of the side member, 36, which is on the same side as the open section, 32, and which extends in a direction approximately perpendicular to the plane of the loop body, in order to prevent the clothesline from slipping off that side member, 36, and into the open section, 32. This loop body may generally be used with a C-shaped spring and movable loop end of a type similar to that described previously. It may also be modified as necessary to function with other types of springs such as helical and two-legged springs. As shown in FIGS. 15 through 18, this loop body is made from a stamping of sheet metal although other methods of fabrication can be used. These drawings show how the thumb rest, 38, can be made from this material.

A fastening device with the loop body shown in FIGS. 15 through 18 can be used by first having the end of the hanger hook, which is suspended from a clothesline, pointing toward the person using the fastening device. After elongating the loop, as described with reference to FIGS. 1 and 2, the device is moved so that the shank or inboard section of the hook enters the open section, 32, and into the inner region of the loop near the fixed loop end, 33. Then the fastening device is simply raised so that the end of the hanger hook passes through the inner region of the loop, 39, without the open section, and released in a fastening position corresponding generally with that shown in FIG. 11.

Figure 20:
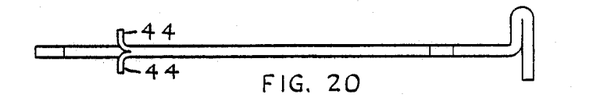
FIG. 20 is a side elevational view of the loop body shown in FIG. 19.

The loop body may also have an open section, 41, without a structural support member near the open section as shown in FIGS. 19 and 20. In this case some additional stiffness may be provided for the structure by having a support member, 42, between the side members at or near the pivotal connection points, 43, for the C-shaped spring. Additional stiffness may also be furnished by having thicker material in the loop body. Projections, 44, which extend in a direction approximately perpendicular to the plane of the loop body, may be provided on the side member next to the open section as limit stops for the movable loop end and to prevent the clothesline from slipping off the side member and into the open section, 41. In addition to being usable with a C-shaped spring, this loop body may also be modified for use with other types of springs. A fastening device with the loop body shown in FIGS. 19 and 20 is used in a generally similar manner to the device described with reference to FIGS. 15 through 18 except that the hanger hook need not be oriented in any particular direction.

Figure 21:
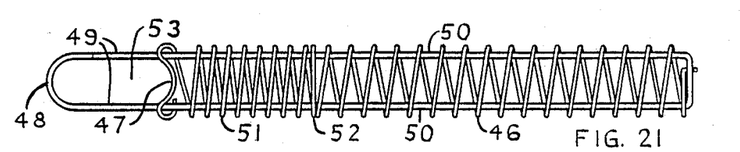
FIG. 21 is a plan view of the loop fastening device with a helical spring and finger grip on the spring.
Figure 22:
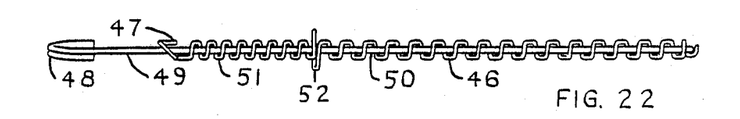
FIG. 22 is a side elevational view of the device shown in FIG. 21.
Figures 23, 24, 25:
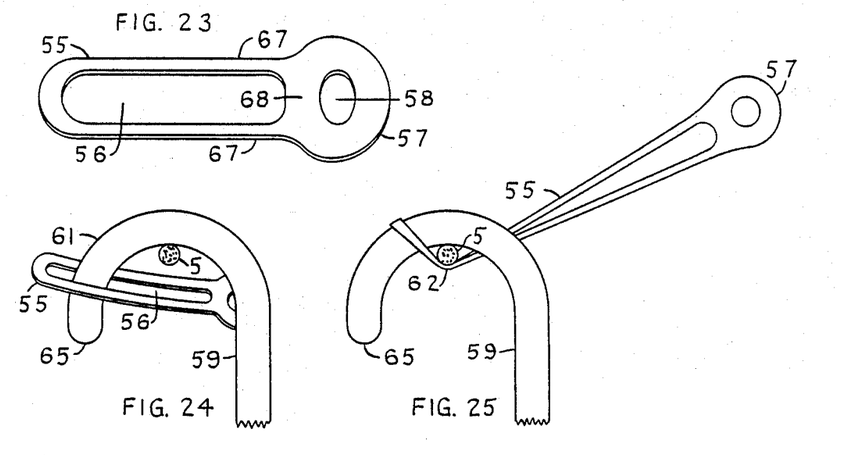
Figure 26:
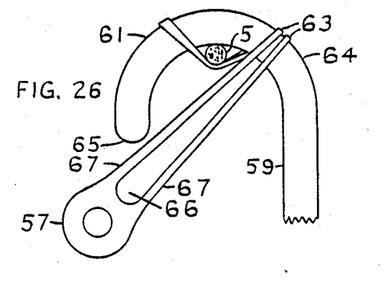
Figure 27:
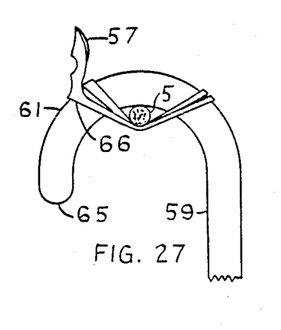

FIGS. 21 and 22 show a fastening device employing a helical type spring, 46, which acts and is slidable along the side members, 49 and 50, of the loop body. This allows the movable loop end, 47, to move back and forth along the side members to increase or decrease the effective length of the loop. The effective length of the loop is that distance and portion of the loop which lies between the fixed loop end, 48, and the movable loop end, 47, and is thus a variable quantity depending on the position of the movable loop end. The loop body is that portion of the fastening device which generally includes the fixed loop end and the side members. The side members, which are ordinarily parallel, are comprised of the sides, 49, of the effective portion of the loop, which is that variable portion of the side members lying within the effective length of the loop as determined by the position of the movble loop end, 47, and the side extensions, 50, of the loop which is that variable portion of the side members extending on the other side of the movable loop end.

In the device shown in FIGS. 21 and 22, that portion, 51, of the helical type spring nearest the movable loop end is shaped so that it can be grasped by the fingers and thereby used as a hand hold in manipulating the device. There may be a raised portion, 52, in the spring to assist in preventing the fingers from slipping along the spring. This fastening device can be used as follows. After inserting the hanger hook into the inner region of the loop, 53, so that the loop is mounted on the shank portion of the hook, and suspending the hanger hook from the clothesline, pull the hand hold, 51, on the spring to elongate the loop (with the fixed loop end, 48, being held by the shank of the hook) and maneuver the fastening device so that the end of the hook passes through the loop and so that the fastening device is raised and released into a position corresponding generally with that shown in FIG. 11.

The examples presented herein have specifically involved the fastening of a garment hanger and its hook to a thin linear member. Generally, an object, different than a garment hanger can also be connected to a linear member by these methods and devices. To do this, the object can be temporarily or permanently attached to the non-hooked or shank portion of a hook by any appropriate means such as bolting, welding, tying, fastening with a snap fastener, etc. Then the hook can, in turn, be hooked to the linear member in the normal manner and fastened to it by means of a loop fastening device as described herein.

The foregoing is considered as illustrative only of the principles of the invention. Further, since numerous modifications and changes will readily occur to those skilled in the art, it is not intended to limit the invention to the exact construction and operation described, and accordingly all suitable modifications and equivalents may be resorted to, falling within the scope of the invention as claimed.

What is claimed is:

1. A connecting device generally capable of connecting an object to a generally linear member, said device comprising the combination of a hook and a clip having a generally elongated loop of at least semi rigid construction for fastening the hook to the linear member, wherein the clip has means for allowing the effective length of the loop to be elastically extended, wherein there is means for attaching the object, at least indirectly and at least temporarily, to the hook, generally to the non-hooked or shank portion of the hook, wherein the hook is of such size with respect to the diameter or thickness of the linear member to which it is being fastened that the linear member is comparatively thin with respect to the size of the hook, as exemplified by the comparison in size between a typical garment hanger hook and a typical clothesline, and wherein the installed position and assembled configuration of said connecting device is one in which the object, when it is being connected to the linear member, is attached to the hook by means mentioned above, the hook is hooked to the linear member in the normal manner, and the clip is positioned with respect to the hook and the linear member such that the loop contacts and bears upon the outside surface of the hook at two substantially inwardly inclined locations on the hook, one such location being on each side of the position occupied by the linear member, and the loop effectively lies between said two locations where it contacts the outside surface of the hook so as to pass under the linear member and to contact and bear on the undersurface of the linear member, thereby positively and forcefully clamping the hook to the linear member, whereby, in having said object attached or attachable to the hook while the hook is, in turn, fastened or fastenable to the linear member by the clip, said object can be connected to the linear member by said connecting device.

2. The connecting device of claim 1 wherein the hook is the hook of an ordinary, typical, and complete garment hanger, whereby said device is effectively capable of connecting an ordinary garment hanger to a comparatively thin generally linear member such as a clothesline.

3. A method for connecting an object to a generally linear member by means of the connecting device set forth in claim 1, comprising the steps of attaching the object to the hook, generally to the non-hooked or shank portion of the hook, hooking the hook to the linear member in the normal manner, wherein the hook is of such size with respect to the diameter or thickness of the linear member to which it is being fastened that the linear member is comparatively thin with respect to the size of the hook and positioning the clip in the position with respect to the hook and the linear member as set forth therein.

4. A method for connecting an ordinary and typical garment hanger to a generally linear member according to the method of claim 3 for connecting an object to a generally linear member, wherein the step of attaching the object to the hook is accomplished by attaching the body part of a garment hanger to the hook of the garment hanger, such step generally being accomplished during the manufacture of the garment hanger.

5. A connecting device generally capable of connecting an object to a generally linear member, said device comprising the combination of a hook, to which the object can be attached, at least indirectly and at least temporarily, generally to the non hooked or shank portion of the hook, and a clip, having a generally elongated loop of at least semi-rigid construction and means for allowing the effective length of the loop to be elastically extended, for fastening the hook to the linear member, wherein the installed position and assembled configuration of said connecting device is that in which the object, when it is being connected to the linear member, is attached to the hook, the hook is hooked normally to the linear member, and the clip is positioned with respect to the hook and the linear member such that the loop generally contacts the outside surface of the hook at two points, on generally on each side of the position occupied by the linear member, and the remainder of the loop lies between said two points on a path which passes underneath the linear member with the linear member being confined within the space between the hook and the loop.

6. A method for connecting an object to a generally linear member using the device set forth in claim 5 comprising the steps of attaching the object to the non-hooked or shank portion of the hook, hooking the hook to the linear member in the normal manner and putting the clip in a position with respect to the hook and the linear member such that the loop generally contacts the outside surface of the hook at two points, one generally on each side of the position occupied by the linear member, and the remainder of the loop lies between said two points on a path which passes underneath the linear member with the linear member being confined within the space between the hook and the loop.

7. A method for connecting an ordinary and typical garment hanger to a generally linear member according to the method of claim 6 for connecting an object to a generally linear member, comprising the steps of attaching the body part of a garment hanger to the hook of a garment hanger, such step generally being accomplished during the manufacture of the garment hanger, hooking the hook of the garment hanger to the linear member in the normal manner, and putting the clip into a position with respect to the hook and the linear member as set forth therein.

8. The connecting device of claim 5 wherein the hook is the hook of a garment hanger, said device further comprising the body part of a garment hanger, said hook and said body part being parts of the same garment hanger, said body part being the remaining part of the garment hanger for which said hook comprises the usual suspension means, said body part of the garment hanger being the object which said device is generally capable of connecting to said linear member, said object thereby being combined with and made a part of said device.

9. A connecting device generally capable of connecting an object to a generally linear member, said device comprising the combination of a hook and a clip having a generally elongated loop of at least semi rigid construction for fastening the hook to the linear member, wherein the clip has means for changing the effective length of the loop, said means being provided by the loop effectively having two ends which are movable toward and away from and with respect to each other, and the clip also has means for elastically biasing the two ends of the loop to move closer together to decrease the effective length of the loop, wherein there is means for attaching the object, at least indirectly and at least temporarily, to the hook, generally to the non hooked or shank portion of the hook, wherein the hook is of such size with respect to the diameter or thickness of the linear member to which it is being fastened that the linear member is comparatively thin with respect to the size of the hook, as exemplified by the comparison in size between a typical garment hanger hook and a typical clothesline, and wherein the installed position and assembled configuration of said device is that in which the object, when it is being connected to the linear member, is attached to the hook by means mentioned above, the hook is hooked to the linear member in the normal manner, and the clip is positioned with respect to the hook and the linear member such that each of the two ends of the loop generally contacts the outside surface of the hook at a location on the hook at which said outside surface of the hook is substantially inwardly inclined, one such contacting location being on each side of the position occupied by the linear member, and that part of the loop which extends between each of its two ends generally contacts the undersurface of the linear member at two locations, one generally on each side of the plane of the hook, so as to clampingly lock the hook to the linear member, whereby, in having said object attached or attachable to the hook while the hook is, in turn, fastened or fastenable to the linear member by the clip, said object can be connected to the linear member by said device.

10. The connecting device of claim 9 wherein the hook is the hook of a garment hanger, said device further comprising the body part of a garment hanger, said hook and said body part being parts of the same garment hanger, said body part being the remaining part of the garment hanger for which said hook comprises the usual suspension means, said body part of the garment hanger being the object which said device is generally capable of connecting to said linear member, said object thereby being combined with and made a part of said device.

11. A method for connecting an object to a generally linear member by means of the device set forth in claim 9, comprising the steps of attaching the object to the hook, generally to the non-hooked or shank portion of the hook, hooking the hook to the linear member in the normal manner, and positioning the clip in the position with respect to the hook and the linear member set forth therein.

12. A method for connecting an ordinary and typical garment hanger to a generally linear member according to the method of claim 11 for connecting an object to a generally linear member, wherein the step of attaching the object to the hook is accomplished by attaching the body part of a garment hanger to the hook of the garment hanger, such step generally being accomplished during the manufacture of the garment hanger.

13. The connecting device of claim 9 wherein the clip is comprised of a loop body having side members forming the sides of the loop, an effectively closed fixed loop end which is ordinarily fixed with respect to the side members of the loop body and which comprises one of the two ends of the loop, a movable loop end which effectively comprises the other end of the loop and which is generally movable with respect to the side members of the loop body to increase or decrease the effective length of the loop, and an elastic force producing member generally acting on the loop body and the movable loop end to urge these elements in the direction of decreasing the effective length of the loop.

14. The connecting device of claim 13 wherein the clip has generally parallel side members of the loop body, wherein the movable loop end is slidably movable along the side members, and wherein the elastic force producing member is a spring adapted and assembled with the clip so as to generally urge the movable loop end in the direction of decreasing the effective length of the loop.

15. The connecting device of claim 13 wherein the loop body of the clip is made of wire.

16. The connecting device of claim 13 wherein the elastic force producing member of the clip is a generally helical spring acting along the direction of the loop body.

17. The connecting device of claim 13 wherein the dimensions of the clip and the ratio of the maximum extended effective length of the loop to its width is such as to allow the clip to fittingly accomodate a typically shaped hook, such as an ordinary garment hanger hook, without great excess in the width of the loop, wherein the loop is shaped so that it can occupy its described position with respect to the hook and the linear member in the installed position and assembled configuration of the device as specified, and wherein the clip has means for conveniently extending the effective length of the loop and has means for moving the clip during installation solely by holding and manipulating the clip with one hand, such means being provided, at least in part, by appropriately positioned holding surfaces for the fingers, all of such finger holding surfaces being positioned outside of the spaced between the side members of the loop body, one finger holding surface being connected so as to act, at least indirectly, on the movable loop end and another finger holding surface being connected so as to act, at least indirectly, on the fixed loop end.

18. The clip as included in claim 17.

19. The clip as included in claim 17 wherein the loop body has a finger holding surface for the thumb generally at the end opposite to the fixed loop end and wherein there are finger holding surfaces generally connected with and acting on the movable loop end, the finger holding surfaces being positioned in a manner similar to those on a hypodermic syringe to enable the clip to be held and manipulated in a manner analogous to the manner of holding and manipulating a hypodermic syringe.

20. The clip as included in claim 13 wherein the clip has means for keeping the hook in approximate alignment with the longitudinal axis of the loop body.

21. The connecting device of claim 13 wherein said force producing member of the clip is a generally and somewhat C-shaped spring lying generally and approximately in the plane of the loop body, the ends of said spring being pivotally attached to the loop body at pivot attachments which are located on said loop body at a generally somewhat greater distance from the fixed loop end than the movable loop end at the position of said movable loop end which provides the maximum effective length of the loop, said pivot attachments allowing angular movement of said spring in the vicinity of said pivot attachments in at least the plane of the loop body, said spring extending generally outward from each side of said loop body in the vicinity of said pivot attachments and then bending around so as to cross the side members of the loop body at a crossing location which is generally in the vicinity of the movable loop end, said spring being slidably attached to the side members at said crossing location so as to allow said spring to slide along and in the direction of the side members, said spring acting on the movable loop end at said crossing location.

22. The spring as set forth in claim 21, being an element of a spring-including device, wherein said spring is so constructed and shaped that it provides a non linear force-displacement relationship, the force being lower in the high range of elastic displacement than indicated by a linear extrapolation of the force-displacement relationship in the initial range of displacement.

23. The clip as included in claim 21 wherein the spring is so constructed and shaped that it provides a non linear force-displacement relationship, the force being lower in the high range of elastic displacement than indicated by a linear extrapolation of the force-displacement relationship in the initial range of displacement.

24. The clip as included in claim 21 wherein the loop body has a thumb rest at the end opposite the fixed loop end and wherein those portions of the generally and somewhat C-shaped spring which extend outward from each side of the loop body at the crossing location of said spring with respect to the loop body are usable as finger rests or finger holding surfaces, said thumb and finger rests enabling the clip to be held and manipulated in a manner analogous to the manner of holding and manipulating a hypodermic syringe.

25. The clip as included in claim 21 wherein the spring is slidably attached to the side members of the loop body at the crossing location of said spring with the loop body by a clip which interlocks the spring and side members together.

26. The clip of claim 25 wherein the movable loop end is part of said interlocking clip.

27. The clip as included in claim 21.

28. The clip of claim 27 wherein the pivot attachments located on the loop body are substantially closed eyelet loops.

29. The connecting device of claim 13 wherein the clip has an openable section in the loop which is adapted to allow the stem or shank of a hook to enter directly into the inner region of the loop through the opened although normally effectively closed openable section during installation of the clip, without first passing the end of the hook through the loop.

30. The clip as included in claim 29 wherein the openable section is located in the vicinity of the fixed loop end of the clip, said openable section having an entry region which is so shaped and arranged that it causes the openable section to open when the clip is moved in a manner bringing the shank of a hook into said entry region, thereby opening the loop and allowing the shank of the hook to enter directly into the inner region of the loop.

31. The clip of claim 30 wherein the openable section is at the fixed loop end and is comprised of two overlapping segments having an entry region, the openable section being so shaped and arranged that it causes said segments to separate in a direction generally normal to the plane of the loop body when the clip is moved so as to bring the shank of a hook into the entry region, said separation of the segments allowing the shank of the hook to enter directly into the inner region of the loop.

32. The clip of claim 30 wherein the openable section has a ramped exit region to facilitate withdrawing the shank of the hook from the loop during removal of the clip from its fastening position.

33. The clip as included in claim 29 wherein the openable section of the clip is in the vicinity of the fixed loop end of the clip to allow the shank of a hook to enter directly into the inner region of the loop.

34. The clip of claim 33 wherein the openable section of the clip is comprised of at least one section of the clip which is movable away from and with respect to another section of the clip in the vicinity of the fixed loop end of the clip in order to open the clip in that vicinity in the clip.

35. The clip as included in claim 29 wherein the openable section of the clip is comprised of two overlapping segments which are separable with respect to each other to allow the shank of a hook to enter directly into the inner region of the effective loop portion of the clip.

36. The connecting device of claim 13 wherein the clip has an open section in the loop to allow the shank of a hook to enter directly into the inner region of the loop during installation of the clip without first passing the end of the hook through the loop.

37. The connecting device of claim 36 wherein the open section in the loop of the clip is located in the vicinity of and to one side of the effectively closed fixed loop end of the loop.

38. The clip as included in claim 37.

39. The clip as included in claim 36 wherein the open section of the clip is located in the vicinity of and to one side of the effectively closed fixed loop end of the clip and wherein there is a structural support member connecting the two side members of the loop body near the open section to provide strength and stiffness for the side member which is on the same side of the loop body as the open section.

40. The clip as included in claim 36 wherein the open section of the clip is located in the vicinity of and to one side of the effectively closed fixed loop end of the clip and wherein the entire effective inner region of the loop used for accomodating and fastening the hook to the linear member is free of any intermediate blocking member, such as a structural support member connecting the two side members of the loop body.

41. The clip as included in claim 36 wherein the open section of the clip is located in the vicinity of and to one side of the effectively closed fixed loop end of the clip and wherein that side member which is on the same side of the clip as the open section has a projection, generally at the end of that side member, which extends in a direction generally perpendicular to the plane of the loop body to prevent the linear member from slipping off that side member and into the open section in the loop.

42. The connecting device of claim 13 wherein said device has means for allowing the stem or shank of a hook to enter directly into the inner region of the loop of the clip during installation of the clip in its position with respect to the hook and the linear member without first passing the end of the hook through the loop when such installation occurs while the hook is hooked to the linear member.

43. The connecting device of claim 42 wherein said means for allowing the stem or shank of a hook to enter directly into the inner region of the loop of the clip is provided by an openable section in the loop.

44. The connecting device of claim 42 wherein said means for allowing the stem or shank of a hook to enter directly into the inner region of the loop of the clip is provided by an open section in the loop.

45. A method for facilitating installation of the clip included in claim 13 into the position with respect to a hook and a linear member as set forth therein, said method comprising the step of providing the clip with an openable section in the loop so that the shank of the hook can be inserted directly into the inner region of the loop without first passing the end of the hook through the loop.

46. A method for facilitating installation of the clip included in claim 13 into the position with respect to a hook and a linear member as set forth therein, said method comprising the step of providing the clip with an open section in the loop so that the shank of the hook can be inserted directly into the inner region of the loop without first passing the end of the hook thorough the loop.

47. A method for fastening a hook to a comparatively thin linear member, as exemplified by the comparison in size between a typical garment hanger hook and a typical clothesline, comprising the steps of hooking the hook to the linear member in the normal manner and manipulating a clip, having a generally elongated loop of at least semi rigid construction and having means for allowing the effective length of the loop to be elastically extended, into a fastening position with respect to the hook and the linear member such that the loop contacts the outer surface of the hook at two substantially inwardly inclined locations on the hook, one such location being on each side of the position occupied by the linear member, and the loop contacts the undersurface of the linear member between the locations where it contacts the outer surface of the hook to positively and forcefully clamp the hook to the linear member.

48. A method according to claim 47 wherein, in performing the method, the clip is positioned on the hook so that an inboard or shank section of the hook passes through the loop and the clip is manipulated and moved so that the loop goes under the linear member, the end of the hook goes through the loop, and the clip is moved into and released in the described fastening position.

49. A method according to claim 48 wherein, in performing the method, the clip is first positioned on the hook so that the inboard or shank portion of the hook passes through the loop, the hook is then hooked to the linear member, and the clip is then manipulated and moved so that the loop goes under the linear member, the end of the hook goes through the loop, and the clip is moved into and released in the described fastening position.

50. A method according to claim 48 wherein, in performing the method, the hook is first hooked to the linear member, the clip is then moved so that the end of the hook passes through the loop, relatively speaking, the clip is then further moved so that the loop passes between the hook and the linear member to position the clip with the inboard or shank portion of the hook passing through the loop, the clip is then manipulated and moved so that the loop passes under the linear member, so that the end of the hook passes through the loop, and the clip is moved into and released in the described fastening position.

51. A method according to claim 48 wherein the clip has an openable section in the loop and wherein, in performing the method, the clip is moved with respect to the hook, which is ordinarily suspended from the linear member, so that the inboard or shank portion of the hook moves through the openable section of the loop and inner region of the into the loop, and the clip is moved and manipulated so that the loop passes under the linear member, so that the end of the hook passes through the loop, and the clip is moved into and released in the described fastening position.

52. A method according to claim 48 wherein the clip has an open section in the loop and wherein, in performing the method, the clip is moved with respect to the hook, which is ordinarily suspended from the linear member, so that the inboard or shank portion of the hook moves through the open section of the loop and into the inner region of the loop portion of the clip, and the clip is moved and manipulated so that the loop passes under the linear member, so that the end of the hook passes through the loop, and the clip is moved into and released in the described fastening position.

53. A method according to claim 48 wherein the manner in which the clip is manipulated as set forth therein includes the act of extending the effective length of the loop by grasping and moving structure connected to one part of the clip while another part of the clip is restrained by contact with the hook, generally that part of the clip which is positioned on the inboard section of the hook.

54. A method according to claim 48 wherein the manner in which the clip is manipulated as set forth therein includes the act of extending the effective length of the loop by grasping each of two parts of the clip which are movable with respect to each other to change the effective length of the loop and manipulating and moving said two parts with respect to each other so as to extend the effective length of the loop.

55. A method according to claim 54 wherein the clip has a movable loop part which is movable with respect to the primary clip structure to effectively extend the length of the loop and wherein the manner in which the clip is manipulated to extend the effective length of the loop is by generally pressing together structure connected to the movable loop part and structure connected to the primary clip structure.

56. A method for fastening an ordinary and typical garment hanger to a comparatively thin generally linear member such as a clothesline according to the method of claim 47, comprising the steps of hooking the hook of the garment hanger to the linear member and manipulating a clip as described therein into a fastening position with respect to the hook and the linear member as set forth therein.

57. A connecting device for connecting an object to a generally linear member by the method of claim 47 for fastening a hook to a linear member, the device comprising the combination of a hook and a clip having a generally elongated loop of at least semi rigid construction for fastening the hook to the linear member, wherein the clip has means for elastically extending the effective length of the loop, wherein the hook is of such size with respect to the diameter or thickness of the linear member to which it is being fastened that the linear member is comparatively thin with respect to the size of the hook, wherein there is means for attaching the object, at least indirectly and at least temporarily, to the hook, generally to the non-hooked or shank portion of the hook, and wherein the installed position and assembled configuration of the device is one in which the object, when it is being connected to the linear member, is attached to the hook by means mentioned above, the hook is hooked to the linear member in the normal manner, and the clip is positioned with respect to the hook and the linear member in the described fastening position with respect to the hook and the linear member.

58. A method for connecting an object to a generally linear member comprising the steps of attaching the object to the non hooked or shank portion of a hook, hooking the hook to the linear member in the normal manner, wherein the hook is of such size with respect to the diameter or thickness of the linear member to which it is being fastened that the linear member is comparatively thin with respect to the size of the hook, as exemplified by the comparison in size between a typical garment hanger hook and a typical clothesline, and manipulating a clip having a generally elongated loop of at least semi rigid construction, wherein the clip has means for allowing the effective length of the loop to be elastically extended, into a fastening position with respect to the hook and the linear member such that the loop contacts and bears upon the outer surface of the hook at two substantially inwardly inclined locations on the hook, one such location being one each side of the position occupied by the linear member, and the loop contacts and bears on the undersurface of the linear member between the locations where it contacts the outer surface of the hook to positively and forcefully clamp the hook to the linear member and thereby connect the object to the linear member.

59. A method for connecting an ordinary and typical garment hanger to a generally linear member according to the method of claim 58 for connecting an object to a generally linear member, comprising the steps of attaching the body part of a garment hanger to the hook of a garment hanger, such step generally being accomplished during the manufacture of the garment hanger, hooking the hook of the garment hanger to the linear member in the normal manner, and manipulating a clip as described therein into a fastening position with respect to the hook and the linear member as set forth therein.

60. A connecting device for connecting an object to a generally linear member by the method of claim 68, said device comprising the combination of a hook and a clip having a generally elongated loop of at least semi rigid construction for fastening the hook to the linear member, wherein the clip has means for allowing the effective length of the loop to be elastically extended, wherein there is means for attaching the object, at least indirectly and at least temporarily, to the hook, generally to the non-hooked or shank portion of the hook, wherein the hook is of such size with respect to the diameter or thickness of the linear member to which it is being fastened that the linear member is comparatively thin with respect to the size of the hook, and wherein the installed position and assembled configuration of the device is one in which the object, when it is being connected to the linear member, is attached to the hook by means mentioned above, the hook is hooked to the linear member in the normal manner, and the clip is positioned with respect to the hook and the linear member such that the loop contacts and bears upon the outer surface of the hook at two substantially inwardly inclined locations on the hook, one such location being on each side of the position occupied by the linear member, and the loop contacts and bears on the undersurface of the linear member between the locations where it contacts the outer surface of the hook to positively and forcefully clamp the hook to the linear member, whereby, in having said object attached or attachable to the hook while the hook is, in turn, fastened or fastenable to the linear member by the clip, said object can be connected to the linear member by said device.

61. The connecting device of claim 60 wherein the means that the clip has for allowing the effective length of the loop to be elastically extended is provided by the loop effectively having two ends which are movable toward and away from and with respect to each other and an elastic force producing member interposed, at least indirectly, between the two ends which urges the two ends to move closer together to decrease the effective length of the loop and wherein, in the installed position and assembled configuration of the device, the clip is positioned with respect to the hook and the linear member such that one of the two ends of the loop contacts the outside surface of the hook at one of the specified substantially inwardly inclined locations on the hook and the other end of the loop contacts the outside surface of the hook at the other specified substantially inwardly inclined location on the hook, and the loop contacts the undersurface of the linear member between the locations wherein its ends contact the outside surface of the hook.

62. A method for connecting an object to a generally linear member comprising the steps of attaching the object to a hook, generally to the non-hooked or shank portion of the hook, hooking the hook to the linear member in the normal manner, and manipulating a clip having a generally elongated loop of at least semi rigid construction, wherein the clip has means for allowing the effective length of the loop to be elastically extended, into a fastening position with respect to the hook and the linear member such that the loop contacts the outside surface of the hook at two points, one generally on each side of the position occupied by the linear member, and the loop lies between said two points on a path which generally passes the side of the linear member opposite to the side closest to the inner surface of the hook.

63. A method for connecting an ordinary and typical garment hanger to a generally linear member according to the method of claim 62 for connecting an object to a generally linear member, comprising the steps of attaching the body part of a garment hanger to the hook of a garment hanger, such step generally being accomplished during the manufacture of the garment hanger, hooking the hook of the garment hanger to the linear member in the normal manner, and manipulating a clip as described therein into a fastening position with respect to the hook and the linear member as set forth therein.

64. A connecting device for connecting an object to a generally linear member by the method of claim 62, said device comprising the combination of a hook and a clip having a generally elongated loop of at least semi rigid construction for fastening the hook to the linear member, wherein the clip has means for allowing the effective length of the loop to be elastically extended, wherein there is means for attaching the object, at least indirectly and at least temporarily, to the hook, generally to the non-hooked or shank portion of the hook, and wherein the installed position and assembled configuration of the device is one in which the object, when it is being connected to the linear member, is attached to the hook by means mentioned above, the hook is hooked to the linear member in the normal manner, and the clip is positioned with respect to the hook and the linear member such that the loop contacts the outside surface of the hook at two points, one generally on each side of the position occupied by the linear member, and the loop lies between said two points on a path which generally passes the side of the linear member opposite to the side closest to the inner surface of the hook.

* * * * *